US009083696B1

(12) United States Patent
Khaitan

(10) Patent No.: US 9,083,696 B1
(45) Date of Patent: Jul. 14, 2015

(54) TRUSTED PEER-BASED INFORMATION VERIFICATION SYSTEM

(75) Inventor: Pranav Khaitan, Mountain View, CA (US)

(73) Assignee: Google Inc., Mountain View, CA (US)

( * ) Notice: Subject to any disclaimer, the term of this patent is extended or adjusted under 35 U.S.C. 154(b) by 181 days.

(21) Appl. No.: 13/484,225

(22) Filed: May 30, 2012

(51) Int. Cl.
*H04L 29/06* (2006.01)
*H04L 9/32* (2006.01)

(52) U.S. Cl.
CPC .......... *H04L 63/0823* (2013.01); *H04L 9/3268* (2013.01)

(58) Field of Classification Search
CPC .......................... H04L 63/0823; H04L 9/3268
USPC .................................................. 713/156, 158
See application file for complete search history.

(56) References Cited

U.S. PATENT DOCUMENTS

| | | | | |
|---|---|---|---|---|
| 6,381,698 | B1 * | 4/2002 | Devanbu et al. | 713/170 |
| 7,831,824 | B2 * | 11/2010 | Abdulhayoglu | 713/156 |
| 7,930,764 | B2 * | 4/2011 | Hug et al. | 726/29 |
| 8,108,536 | B1 * | 1/2012 | Hernacki et al. | 709/231 |
| 8,214,634 | B1 * | 7/2012 | Steele et al. | 713/152 |
| 8,327,146 | B2 * | 12/2012 | Madhavan et al. | 713/175 |
| 8,429,734 | B2 * | 4/2013 | Agbabian et al. | 726/10 |
| 8,468,339 | B2 * | 6/2013 | Parkinson et al. | 713/156 |
| 8,484,460 | B1 * | 7/2013 | Vaughn | 713/155 |
| 8,578,166 | B2 * | 11/2013 | De Monseignat et al. | 713/175 |
| 8,677,466 | B1 * | 3/2014 | Chuang et al. | 726/9 |
| 8,789,163 | B2 * | 7/2014 | Cahn | 726/10 |
| 2001/0000191 | A1 * | 4/2001 | Barkan et al. | 705/59 |
| 2002/0078347 | A1 * | 6/2002 | Hericourt et al. | 713/156 |
| 2007/0094494 | A1 * | 4/2007 | Banerjee et al. | 713/157 |
| 2008/0109653 | A1 * | 5/2008 | Yokohama | 713/156 |
| 2008/0307222 | A1 * | 12/2008 | Chow et al. | 713/156 |
| 2010/0217989 | A1 * | 8/2010 | Sauve et al. | 713/175 |

OTHER PUBLICATIONS

Choi, Jong Hyuk; Lim, Sang Seok; Zeilenga, Kurt D.; "A New On-line Certificate Validation Method using LDAP Component Matching Technology", Proceedings from the Sixth Annual IEEE SMC Information Assurance Workshop, Jun. 15-17, 2005, pp. 280-285.*
Platis, A.N.; Koutras, V.P.; "Software Rejuvenation on a PKI", IEEE Second International Workshop on Software Aging and Rejuvenation (WoSAR), Nov. 2, 2010, pp. 1-6.*

(Continued)

*Primary Examiner* — Victor Lesniewski
(74) *Attorney, Agent, or Firm* — McDermott Will & Emery LLP

(57) ABSTRACT

A system for providing a trusted peer-based information verification system may include one or more processors and a memory. The one or more processors may facilitate steps of receiving an identification item from a server hosting a web site and providing a request for verification of the identification item to devices of trusted peers. The steps may further include receiving verification responses from the devices of the trusted peers. The verification responses may be indicative of whether identification items received by the devices of the trusted peers via the web site are different than the identification item received from the server hosting the web site. The steps may further include determining a validity of the identification item based on the verification responses received from the devices of the trusted peers. In one example the identification item may be a digital certificate, such as a public key certificate.

17 Claims, 7 Drawing Sheets

(56) References Cited

OTHER PUBLICATIONS

"Public Key Certificate", retrieved from <http://en.wikipedia.org/w/index.php?title=Public_key_certificate&oldid=493614092>, May 21, 2012, 7 pages.

"Public-key cryptography", Wikipedia—The Free Encyclopedia, last modified May 16, 2012, retrieved from <http://en.wikipedia.org/wiki/Public-key_cryptography>.

"Revocation list", Wikipedia—The Free Encyclopedia, last modified May 19, 2012, retrieved from <http://en.wikipedia.org/wiki/Revocation_list>.

"Public key certificate", Wikipedia—The Free Encyclopedia, last modified May 21, 2012, retrieved from <http://en.wikipedia.org/wiki/Public_key_certificate>.

* cited by examiner

TRUSTED PEER-BASED INFORMATION VERIFICATION SYSTEM

TECHNICAL FIELD

The present description relates generally to verification systems, and more particularly, but not exclusively, to a trusted peer-based information verification system.

BACKGROUND

The Internet may provide users with an abundance of readily accessible information, such as the documents of the World Wide Web. However, due to the ease at which information can be published onto the Internet, it may be difficult for users to verify the validity of information retrieved from the Internet. It may also be difficult for users to verify the identity of the web servers that provide the information over the Internet, even when the web servers implement secure communication protocols.

SUMMARY

The disclosed subject matter relates to a machine-implemented method for providing a trusted peer-based information verification system. The method may include receiving, using one or more computing devices, an identification item from a server hosting a web site. The method may further include providing, using the one or more computing devices, a request for verification of the identification item to devices of trusted peers. The method may further include receiving, using the one or more computing devices, verification responses from the devices of the trusted peers, wherein the verification responses are indicative of whether identification items received by the devices of the trusted peers via the web site are different than the identification item received from the server hosting the web site. The method may further include determining, using the one or more computing devices, a validity of the identification item based on the verification responses received from the devices of the trusted peers.

In another aspect, a machine implemented method may include receiving, using one or more computing devices, a verification request from a device of a trusted peer, wherein the verification request comprises a first identification item and an identifier of a web site corresponding to the first identification item. The method may further include retrieving, using the one or more computing devices and from a memory, a second identification item received from a server hosting the web site, and determining, using the one or more computing devices, whether the first identification item is different than the second identification item. The method may further include providing, using the one or more computing devices, an indication of whether the second identification item is different than the first identification item to the device of the trusted peer. The method may further include blocking, using the one or more computing devices, subsequent communications with the server hosting the web site when the second identification item is determined to be different than the first identification item.

In another aspect, a machine implemented method may include receiving, using one or more computing devices, a verification request from a requesting device of a requesting user, wherein the verification request comprises a verification information item and an identifier of a web site. The method may further include determining, using the one or more computing devices, a plurality of users associated with the requesting user, and providing, using the one or more computing devices, the verification request to a plurality of devices of the plurality of users associated with the requesting user. The method may further include receiving, using the one or more computing devices, verification responses from at least some of the plurality of devices of at least some of the plurality of users, wherein the verification responses are indicative of whether information items received by the at least some of the plurality of devices via the web site are different than the verification information item of the verification request. The method may further include determining, using the one or more computing devices, a validity of the verification information item based on the received verification responses, and providing, using the one or more computing devices, the validity of the verification information item to the requesting device of the requesting user. The method may further include providing, when the verification information item is determined to be invalid and using the one or more computing devices, the validity of the verification information item to the plurality of devices of the plurality of users associated with the user.

The disclosed subject matter also relates to a system for providing a trusted peer-based information verification system. The system may include one or more processors and a memory including instructions that, when executed by the one or more processors, cause the one or more processors to facilitate the steps of: receiving a public key certificate from a server hosting a web site, providing a request for verification of the public key certificate to devices of trusted peers, wherein the request for verification comprises the public key certificate and an identifier of the web site, receiving verification responses from the devices of the trusted peers, wherein the verification responses are indicative of whether public key certificates received by the devices of the trusted peers via the web site are different than the public key certificate received from the server hosting the web site, and determining a validity of the public key certificate based on the verification responses received from the devices of the trusted peers.

The disclosed subject matter also relates to a machine-readable medium comprising instructions stored therein, which when executed by a machine, cause the machine to perform a method that includes receiving a verification request from a requesting device of a requesting user, wherein the verification request comprises a verification public key certificate and an identifier of a web site. The method may further include determining a plurality of users associated with the requesting user, providing the verification request to a plurality of devices of the plurality of users associated with the requesting user. The method may further include receiving verification responses from at least some of the plurality of devices of at least some of the plurality of users, wherein the verification responses are indicative of whether public key certificates received by the at least some of the plurality of devices via the web site are different than the verification public key certificate of the verification request. The method may further include determining a validity of the verification public key certificate based on the received verification responses, and providing the validity of the verification public key certificate to the requesting device of the requesting user. The method may further include providing, when the verification public key certificate is determined to be invalid, the validity of the verification public key certificate to the plurality of devices of the plurality of users associated with the requesting user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
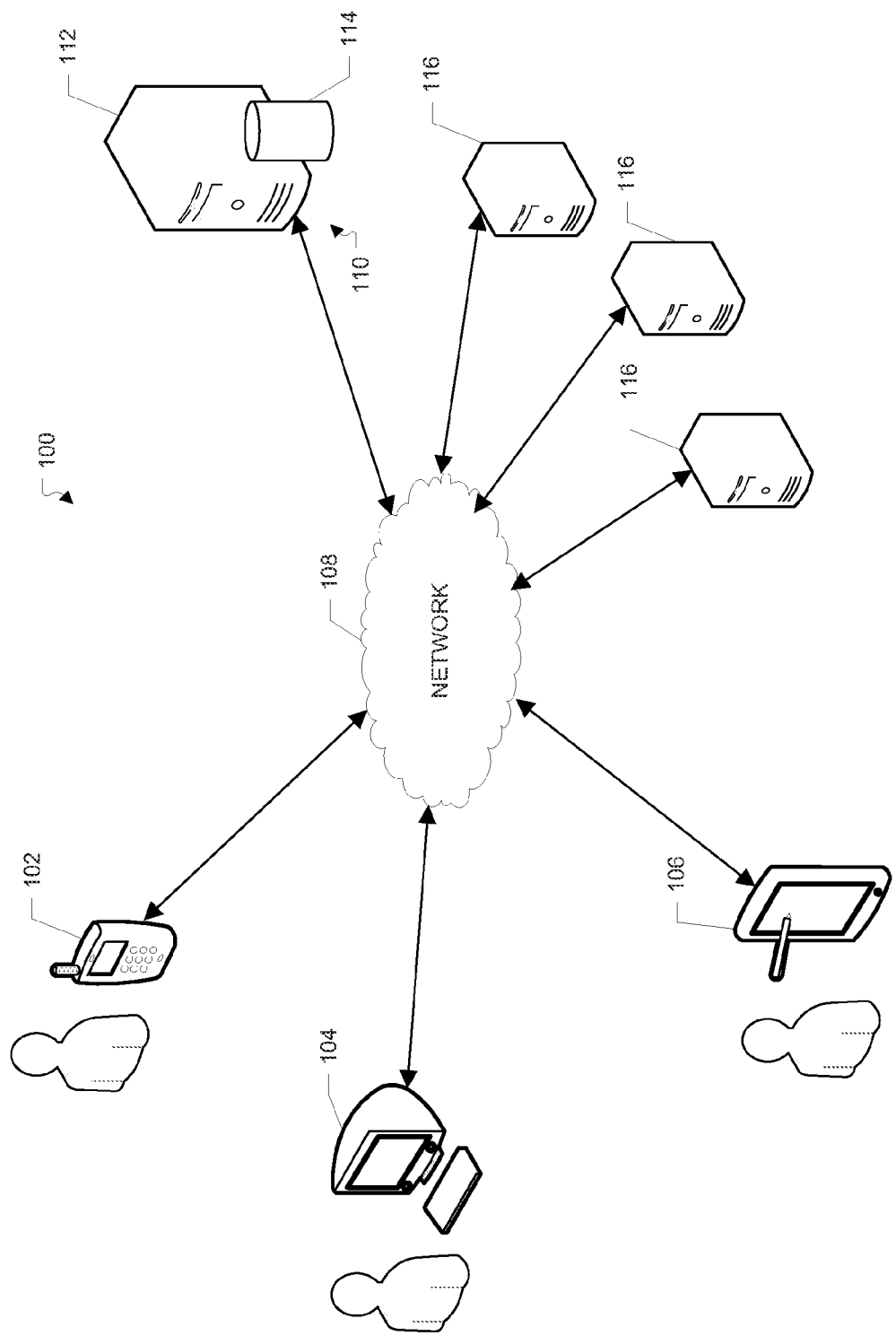
FIG. 1 illustrates an example client-server network environment that may implement a trusted peer-based information verification system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

In order to allow users to interact securely with a web site, a secure sockets layer (SSL) web server hosting the web site may implement an asymmetric cryptography scheme. In an asymmetric cryptography scheme, the web server may encrypt communications with a user using a private key that is only known to the web server. The web server may then provide the user with a public key that may be used to decrypt communications from the web server that have been encrypted using the web server's private key. In this manner, the asymmetric cryptography scheme may provide for secure transactions with the web server; however, the asymmetric cryptography scheme does not provide any assurance to a user that the web server that transmitted the public key is being operated by the entity represented by the web site, rather than a malicious entity.

In order to provide some assurance to users that an SSL web server transmitting a public key for a web site is being operated by the entity represented by the web site, the entity may obtain a public key certificate signed by a certificate provider. The public key certificate may indicate that the certificate provider has verified that the public key, and consequently the SSL web server transmitting the public key, correspond to the entity represented by the web site. The certificate provider may be a third party that is known, and trusted, by the users. The certificate provider may sign public key certificates with the certificate provider's private key. In this manner, a web site may provide the public key certificate signed by the certificate provider to a user, and the user may verify the signature of the certificate provider using the certificate provider's public key. Upon verifying that the public key certificate was signed by a trusted certificate provider, the user may be generally assured that the public key, and the SSL web server that transmitted the public key, correspond to the entity represented by the web site, at least at the time that the public key certificate was signed by the certificate provider.

However, the public key certificate scheme may be limited in that users are only able to verify that the public key certificate was signed, at some point in time, by the certificate provider. The public key certificate scheme may not provide users with a mechanism for verifying whether the certificate has been revoked, and/or whether the certificate provider should no longer be trusted, e.g. whether the certificate provider's signing authority has been revoked and/or whether the certificate provider's security has been compromised. For example, if the security of a certificate provider's systems, or of the certificate provider's private key, have been compromised, an unauthorized third party may be able to sign public key certificates using the certificate provider's private key. In this instance, a user may successfully verify that a given public key certificate was signed by a private key of a trusted certificate provider, but the user may be unaware that the public key certificate was signed by an unauthorized third party, rather than the trusted certificate provider, and therefore should not be trusted. Similarly, if a certificate provider is under the jurisdiction of a foreign government, the foreign government may be able to force the certificate provider to sign public key certificates for any reason, such as for malicious or harmful reasons.

In order to enhance the security of the public key certificate scheme, a certificate revocation list may be provided to users that identifies public key certificates that have been revoked, for example when the private key of the certificate provider has been compromised. The certificate revocation list may be signed by a third party that is known, and trusted, by the users. However, a certificate revocation list may only be useful when the list can be communicated to all affected users in a timely manner, which may not always be possible or practical. Furthermore, a certificate revocation list scheme may suffer from the same vulnerabilities as the public key certificate scheme, e.g., a user may be unable to verify whether the private key of the signer of the certificate revocation list has been compromised.

A trusted peer-based information verification system may provide a more robust enhancement of the security of a public key certificate scheme by providing users with a trusted peer-based verification of the validity of a public key certificate received from a web site. In a trusted peer-based verification system, a user may verify information accessed over the Internet, such as a public key certificate, with a group of their trusted peers, e.g. trusted connections in the user's social network, or any other group of peers that have been identified as trusted.

For example, in some embodiments herein, upon receiving information over the Internet, such as a public key certificate, a user's device may access, or build, a list of trusted peers, such as a list of the user's connections or friends within one or more social networks. The user's device may use the list of trusted peers to communicate the received information, or some indicia thereof (e.g. a hash of the information), to devices of the user's trusted peers, along with an indication of the web site from which the information was received, such as the uniform resource locator (URL) of the web site. If the devices of the user's trusted peers have received comparable information from the identified web site, such as a public key certificate, the devices may respond with an indication of whether the information they received from the web site matches the information received by the user. For example, a device of a trusted peer may send an indication of "match" to indicate that the information received by the user from the web site matches the information received by the user's trusted peer from the web site, or an indication of "mismatch" to indicate that the information received by the user from the web site does not match the information received by the user's trusted peer from the web site. Alternatively, or in addition, the device of the user's trusted peer may send an indication of "not received" to indicate that the user's trusted peer has not received comparable information from the web site. In various embodiments, the information may not be transmitted to or from the trusted peers unless the appropriate parties have been provided notice and/or consent has been obtained.

If the user's device receives an indication of "match" from all of the devices of the user's trusted peers, then the user can be assured that the public key certificate received from the web site is most likely valid. However, if the user's device receives an indication of "mismatch" from one or more of the devices of the user's trusted peers, then the user's device may determine that either the user, or one or more of the user's trusted peers, have received a public key certificate from the web site that is invalid. In this instance, the user's device may provide an indication to the user that the public key certificate received from the web site may be invalid. Alternatively, or in addition, the user's device may block any communications from the web server hosting the web site that provided the public key certificate. Alternatively, or in addition, the user's device may communicate to all of the devices of the user's trusted peers that the web site's public key certificate may be invalid.

In one example, the user may create a list of trusted peers, such as by providing email addresses of trusted peers, providing user identifiers of trusted peers in one or more networks, such as one or more social networks, providing telephone numbers associated with trusted peers, or by providing any other identifiers of peers that are trustworthy, e.g. users who have a high likelihood of providing an accurate response to an information verification request. The list of trusted peers may then be accessed by the user's device in order to verify information received over the Internet. For example, the user's device may communicate directly with the devices of the user's trusted peers, such as through peer-to-peer connections, in order to verify information received from a third party over the Internet. In this manner, the trusted peer-based information verification system may not suffer from the same security vulnerabilities as a certificate revocation list scheme, because the integrity of the trusted peer-based verification system is not dependent on the security of any single device, such as a certificate provider.

Alternatively, or in addition, due to the pervasiveness of social networks, e.g. that users can access their social networks through almost any device, a user's connections in a social network may be used to build the list of trusted peers. For example, a user may indicate that all of the users in their social network that the user is connected to should be used as their trusted peers. In this example, the device of the user may communicate information received over the Internet, and a request for verification thereof, to a server associated with the user's social network. The server associated with the user's social network may then communicate the information, and the request for verification, to the devices of the user's trusted peers, e.g. the devices of any users connected to the user in a social network. The devices of the trusted peers may communicate a response to the server associated with the social network, or may communicate a response directly to the device of the verifying user. In the example where the devices of the trusted peers communicate the response to the server associated with the social network, the server may process the responses and provide an indication of the validity of the information to the device of the user, or the server associated with the social network may forward the responses from the devices of the trusted peers to the device of the user.

In one example, a user may set a threshold corresponding to a number of "mismatched" responses that are permissible for a given interaction type before indicating that a public key certificate may be invalid. In this example, the user's interactions with a web site may be characterized as one or more interaction types. For example, the user's interaction with the web site may be characterized as a passive interaction when the user is not providing any information to the web site. For passive interactions, the user may be less concerned about the validity of the public key certificate of the web site. Thus, for passive interactions the user may set a high threshold for triggering a notification that the public key certificate of the web site may be invalid. For example, the user may not be notified that the public key certificate of the web site may be invalid unless the user's device receives a large number of "mismatch" responses, such as fifty percent of the total responses received.

Alternatively, or in addition, the user's interaction with the web site may be characterized as an active interaction when the user is providing information to the web site, such as personal information. For active interactions, the user may be more concerned about the validity of the public key certificate of the web site. Thus, for active interactions, the user may set a high threshold for triggering a notification that the public key certificate of the web site may be invalid. For example, the user may be notified that the public key certificate of the web site may be invalid upon receiving a single "mismatch" response.

The trusted peer-based information verification system may operate on the user's device and/or on the device of the user's trusted peers, as a browser plug-in, a system service, such as a background service, a standalone application, or generally as any process that allows the user's device and the devices of the user's trusted peers to send information verification requests and receive information verification responses. The trusted peer-based information verification system may also operate as an application of a social network service. In this example, the trusted peer-based information verification system may utilize the communication and application framework of the social network service in order to build a list of a requesting user's trusted peers, e.g. users associated with the requesting user in the social network, provide verification requests to the devices of the user's trusted peers and/or receive verification responses from the devices of the user's trusted peers.

For explanatory purposes, the trusted peer-based information verification system has been described in the context of a public key certificate scheme. However, the trusted peer-based information verification system may be used to verify any information that may be received from a third party over the Internet and/or to enhance other security mechanisms, such as other asymmetric cryptography security mechanisms.

II. Example Client-Server Network Environments for Providing a Trusted Peer-Based Information Verification System FIG. 1 illustrates an example client-server network environment which may implement a trusted peer-based information verification system. Network environment 100 may include a number of electronic devices 102, 104, 106 communicably connected to server 110 and web servers 116, such as by network 108. In another example, electronic devices 102, 104, 106 may be communicably connected to one another, such as by network 108, but not communicably connected to server 110. Network 108 may be a public communication network (such as the Internet, cellular data network, dialup modems over a telephone network) or a private communications network (such as private local area network ("LAN"), leased lines). Network 108 may also include, but is not limited to, any one or more of the following network topologies, including a bus network, a star network, a ring network, a mesh network, a star-bus network, a tree or hierarchical network, and the like.

In some examples, electronic devices 102, 104, 106 can be computing devices such as laptop or desktop computers, smartphones, personal digital assistants ("PDAs"), portable media players, tablet computers, televisions or other displays with one or more processors coupled thereto or embedded therein, or other appropriate computing devices that can be used for displaying a web page or a web application. Alternatively, or in addition, electronic devices 102, 104, 106 can be devices that do not include a display capable of displaying a web page or a web application, or devices that include a display capable of displaying a web page or a web application but are otherwise incapable of displaying a web page or a web application. In general, electronic devices 102, 104, 106 may be any devices capable of any form of communication with at least one of the other electronic devices 102, 104, 106, and/or with the server 110, irrespective of whether the electronic devices 102, 104, 106 are capable of displaying a web page or a web application. In the example of FIG. 1, electronic device 102 is depicted as a smartphone, electronic device 104 is depicted as a desktop computer and electronic device 106 is depicted as a tablet device.

In one example, server 110 includes processing device 112 and data store 114. Processing device 112 executes computer instructions stored in data store 114, for example, to provide a trusted peer-based information verification system to one or more of the electronic devices 102, 104, 106. Data store 114 may store the computer instructions on non-transitory computer-readable medium. Alternatively, or in addition, server 110 may provide a social network service to users accessing the electronic devices 102, 104, 106, and/or the server 110 may be associated with a social network service provided to users accessing the electronic devices 102, 104, 106.

In one example, server 110 and/or web servers 116 may be individual computing devices such as individual computer servers. In another example, server 110 and/or web servers 116 may represent more than one computing device working together to perform the actions of a server computer (such as a cloud of computers and/or a distributed system). In another example, server 110 and/or web servers 116 may be coupled with various databases, storage services, or other computing devices. Server 110 and/or web servers 116 and the coupled databases, storage services, or other computing devices may be collocated, or may be disparately located.

Communications between electronic devices 102, 104, 106, server 110 and web servers 116 may be facilitated through the Hypertext Transfer Protocol ("HTTP") communication protocol. Other communication protocols may also be used including, for example, Extensible Messaging and Presence Protocol (XMPP) communication, for some or all communications between electronic devices 102, 104, 106, server 110, and web servers 116. In another example, the electronic devices 102, 104, 106 may be in communication with one another without communicating with server 110.

Users interacting with electronic devices 102, 104, 106 may access web sites provided by the web servers 116 that are communicably coupled to network 108. For example, a user interacting with electronic device 102 may request to access a web page provided by a web server 116. In response to receiving the request from electronic device 102, web server 116 may provide an identification item to the electronic device 102 that corresponds to, or may be used to verify, the identity of the entity operating the web server. The phrase "identification item" as used herein encompasses its plain and ordinary meaning and may also refer to any item that provides information corresponding to the identity of a web server, or of an entity operating the web server, such as a digital certificate, a public key certificate, an Internet Protocol (IP) address, or any other identifier.

Upon receiving the identification item from the web server 116, the electronic device 102 may provide a request for verification of the identification item to a group trusted peers. The phrase "trusted peer" as used herein encompasses its plain and ordinary meaning and may also refer to any other user, device, or entity, that can be characterized as having a high likelihood of providing an accurate response to an information verification request. In one example, a group of trusted peers may be a group of peers connected with a user in a social network. The phrase "connected" as used herein encompasses its plain and ordinary meaning and may also refer to a direct, or indirect, association between users in a network, such as a social network. Alternatively, or in addition, a group of trusted peers may be based on selections of individual contacts in a user's social network, preset groups of contacts in the user's social network, such as social circles, or generally any grouping or arrangement of contacts in the user's social network.

In FIG. 1, the trusted peers may be the users accessing electronic devices 104, 106. The request for verification of the identification item may include the identification item and an identifier of the web site corresponding to the identification item, such as the uniform resource locator (URL) of the web site. The electronic device 102 may receive verification responses from each of the trusted peers that may indicate whether the electronic devices 104, 106 of each of the trusted peers received an identification item from the web server 116 that matches the identification item received by the electronic device 102.

The phrase "matches" as used herein encompasses its plain and ordinary meaning and may also indicate that two or more identification items are substantially equivalent, that two or more identification items convey substantially the same information, or that two or more identification items identify, or correspond to, a same entity. Conversely, the phrase "mismatches" as used herein encompasses its plain and ordinary meaning and may also indicate that two or more identification items are not substantially equivalent, that two or more identification items do not convey substantially the same information, or that two or more identification items do not identify, or correspond to, a same entity.

The electronic device 102 may process the verification responses received from the devices 104, 106 of the trusted peers and may determine the validity of the identification item based on the verification responses. For example, if all of the verification responses received by the electronic device 102 indicate that the identification item received by the electronic device 102 matches the identification items received by the electronic devices 104, 106 of the trusted peers, the electronic device 102 may determine that the identification item is invalid. Conversely, if the received verification responses indicate that one or more of the electronic devices 104, 106 of the trusted peers received an identification item corresponding to the web server 116 that does not match the identification item received by the electronic device 102, the electronic device 102 may determine that the identification item is invalid. The process of determining the validity of an identification item is discussed further in FIG. 2 below.

Alternatively, or in addition, the electronic device 102 may provide a request for verification to trusted peers for any information items received from the web server 116. The phrase "information item" as used herein encompasses its plain and ordinary meaning and may also refer to an identification item, a digital certificate, a public key certificate, or generally any information that may be received from a web server or via a web site. In this instance, the request for verification may include an information item received from the web server 116 and the identifier of the web site provided by the web server 116. The electronic devices 104, 106 may provide verification responses indicating whether they received a substantially similar information item from the web server 116, or corresponding to the web server 116. The electronic device 102 of the user may then determine the validity of the information item based on the verification responses.

In another example, the electronic device 102 may receive a request for verification of an identification item, or an information item, from one of the other electronic devices 104, 106, such as an electronic device 104 of a trusted peer. The request for verification may include the identification item and an identifier of the web site corresponding to the identification item, such as the uniform resource locator of the web site. The electronic device 102 may determine whether the electronic device 102 received a comparable identification item for the web site. If the electronic device 102 received a comparable identification item for the web site, the electronic device 102 may compare the identification item received for the web site and the identification item received with the request for verification, such as by computing and comparing a hash value for each of the identification items, comparing the identification items bit-by-bit, or comparing the content of the identification items, such as any text included in the identification items, or any digital signatures included in the identification items. The electronic device 102 may provide a verification response to the electronic device 104 that indicates whether the electronic device 102 received an identification item for the web site that matches the identification item provided with the request for verification. The process of receiving a verification request and providing a verification response is discussed further in FIG. 3 below.

Due to the pervasiveness of social networks across many different electronic devices 102, 104, 106, users may be access their social networks across any of the electronic devices 102, 104, 106. As such, a user may wish to utilize the connections of their social network to build a list of trusted peers, since trusted peers identified in the social network may be accessible across the electronic devices 102, 104, 106, such as to receive verification requests and provide verification responses. In one example, a user may indicate that any other user they are connected to in the social network, directly or indirectly, should be included in their group of trusted peers. In this instance, the electronic device 102, may build a database of contact information for the user's connections in the social network. The electronic device 102 may then use the database of contact information to provide verification requests to the group of trusted peers.

Alternatively, or in addition, the trusted peer-based information verification system may operate as an application, or a module, of a social network service. For example, the electronic device 102 may make an application programming interface (API) call to a social network service to request that the social network service transmit the request for verification to the devices of the connected users in the user's social network. Since the connected users may access the social network service from an application executing on any of the electronic devices 102, 104, 106, the social network service may have a built-in application and communication framework for communicating the request for verification to the connected users, e.g. via the application through which the connected users access the social network service. The process of providing a trusted peer-based information verification system through a social network service is discussed further in FIG. 4 below.

III. Example Processes for a Trusted Peer-Based Information Verification System

Figure 2:
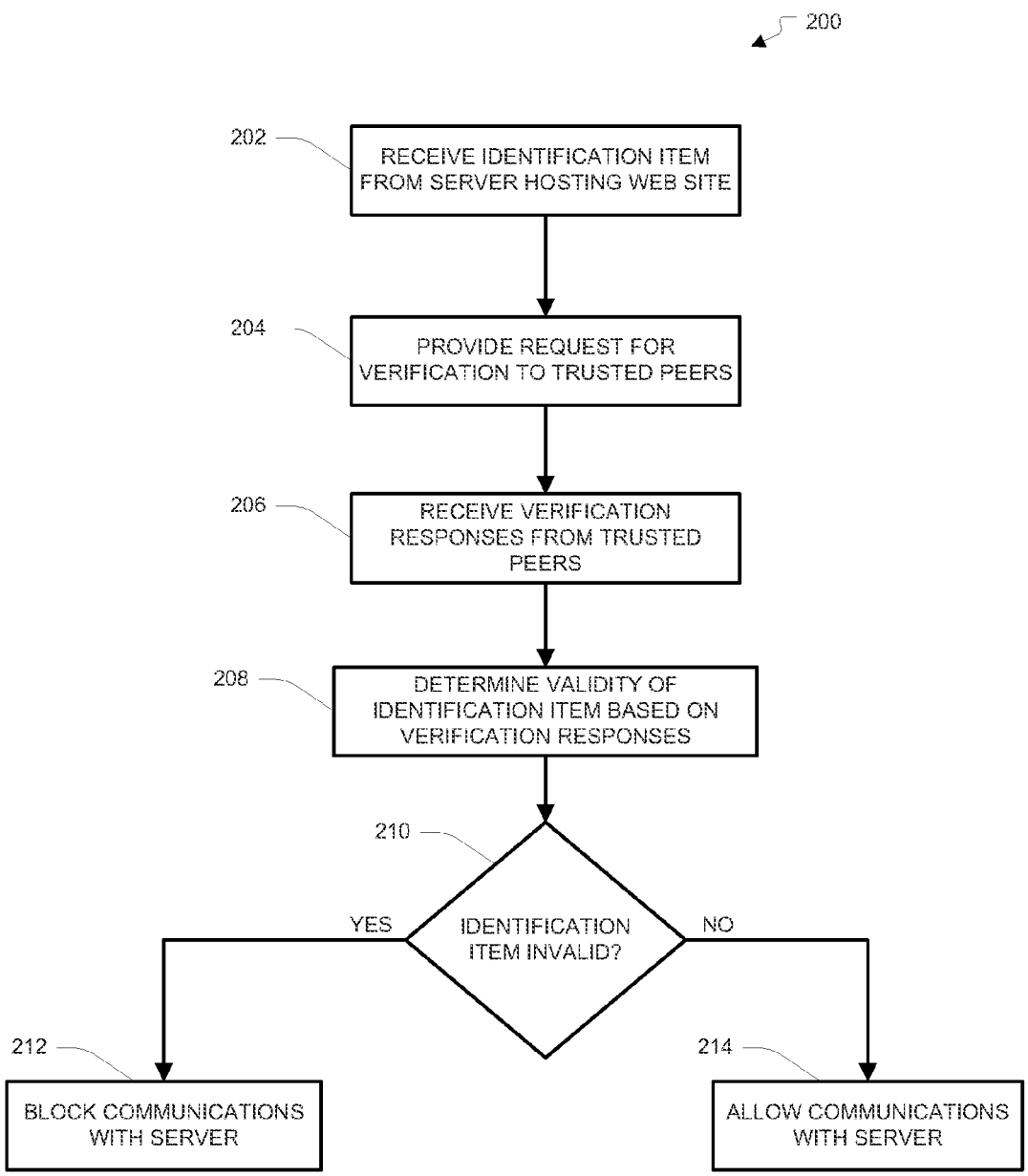
FIG. 2 illustrates a flow diagram of an example process for a trusted peer-based information verification system.

FIG. 2 illustrates a flow diagram of an example process 200 for a trusted peer-based information verification system. In block 202, a user accessing an electronic device 102 may receive an identification item from a web server 116 hosting a web site. For example, the identification item may be a digital certificate, such as a public key certificate.

In block 204, the electronic device 102 may provide a request for verification to the electronic devices 104, 106 of the user's trusted peers. For example, the electronic device 102 may retrieve a list of the user's trusted peers, such as from memory or via a social network service. The list may include various contact information for providing the request for verification to each of the trusted peers, such as internet protocol addresses, user identifiers for online services, such as social network services, telephone numbers, or generally any information that may be used to provide the request for verification to the trusted peers. The request for verification may include the identification item along with an identifier of the web site, such as a uniform resource locator corresponding to the web site. Alternatively, or in addition, the request for verification may include an indicia of the identification item, such as a hash of the identification item.

In block 206, the electronic device 102 may receive verification responses from the electronic devices 104, 106 of the user's trusted peers. The verification responses may indicate whether the electronic devices 104, 106 of the user's trusted peers received an identification item corresponding to the web site that matches the identification item received by the electronic device 102 for the web site. For example, each verification response may indicate that one of the other electronic devices 104, 106 received an identification item that matches the identification item received by the electronic device 102, e.g. a response of "match", received an identification that does not match the identification item received by the electronic device 102, e.g. a response of "mismatch," or that one of the other electronic devices 104, 106 did not receive a comparable identification item for the web site. Alternatively, or in addition, the electronic devices 104, 106 of the trusted peers may only send a verification response if the electronic devices 104, 106 received a comparable identification item for the web site.

In block 208, the electronic device 102 may determine the validity of the identification item based on the verification responses received from the electronic devices 104, 106 of the trusted peers. For example, if any of the verification responses indicate that one of the electronic devices 104, 106 received an identification item for the web site that does not match the identification item the electronic device 102 received for the web site, e.g. a verification response indicating a "mismatch," the electronic device 102 may determine that the identification item is invalid. Alternatively, or in addition, if all of the verification responses indicated a "match," then the electronic device 102 may determine that the identification item is valid.

Alternatively, or in addition, the user may set a threshold corresponding to a number of "mismatch" responses that are permissible for a given interaction type before indicating that an identification item may be invalid. In this example, the user's interactions with a web site may be characterized as one or more interaction types. For example, the user's interaction with the web site may be characterized as a passive interaction when the user is not providing any information to the web site. For passive interactions, the user may be less concerned about the validity of the identification item of the web site. Thus, for passive interactions the user may set a high threshold for triggering a notification that the identification item of the web site may be invalid. For example, the user may not be notified that an identification item for a web site may be invalid unless the user's device receives a large number of "mismatch" responses, such as fifty percent of the total responses received.

Alternatively, or in addition, the user's interaction with the web site may be characterized as an active interaction when the user is providing information to the web site, such as personal information. For active interactions, the user may be more concerned about the validity of the identification item of the web site. Thus, for active interactions, the user may set a high threshold for triggering a notification that the identification item of the web site may be invalid. For example, the user may be notified that the identification item of the web site may be invalid upon receiving a single "mismatch" response.

In block 210, the electronic device 102 identifies whether the identification item was determined to be valid or invalid. If, in block 210, the electronic device 102 identifies that the identification item was determined to be valid, the electronic device 102 moves to block 214. In block 214, the electronic device 102 allows communication with the web server 116 that provided the identification item, such as by allowing the user to interact with the web site provided by the web server 116. If, in block 210, the electronic device 102 determines that the identification item is invalid, the electronic device 102 moves to block 212. In block 212, the electronic device 212 blocks communication with the web server 116 that provided the identification item, such as by preventing the user from interacting with the web site provided by the web server 116.

Alternatively, or in addition, the electronic device 102 may present a graphical indication to the user that is indicative of whether the identification item was determined to be valid or invalid based on the verification responses received from the user's trusted peers. For example, the electronic device 102 may present a green indicator to the user when the electronic device 102 determines that the identification item is valid, and the electronic device 102 may present a red indicator when the electronic device 102 determines that the identification item.

In one example, a graphical characteristic of the indicator may be modified to convey a level of confidence that the identification item is valid or invalid. The level of confidence may be based on the total number of verification responses received from the electronic devices 104, 106 of the trusted peers, and/or the percentage of the verification responses indicating that the identification item is a match (for a valid determination), or the percentage of verification responses indicating that the identification item is a mismatch (for an invalid determination). The graphical characteristics of the indicator may include the brightness of the indicator, the size of the indicator, the color of the indicator, or generally graphical characteristic that may be modified to convey a determined level of confidence.

Figure 3:
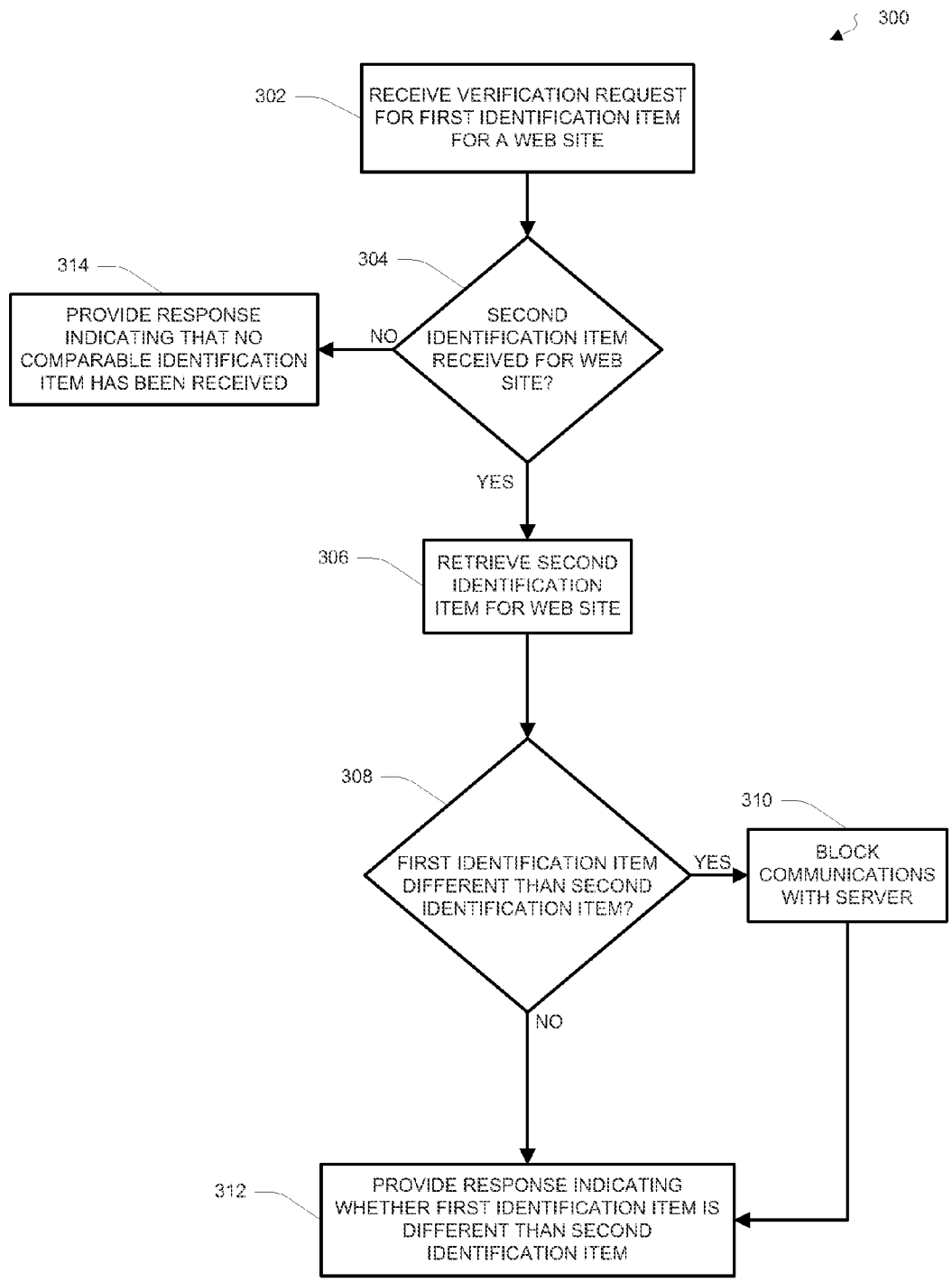
FIG. 3 illustrates a flow diagram of an example process for a trusted peer-based information verification system.

FIG. 3 illustrates a flow diagram of an example process 300 for a trusted peer-based information verification system. In block 302, an electronic device 104 may receive a verification request for a first identification item corresponding to a web site. The first identification item may have been received by another electronic device, such as electronic device 102. For example, the user accessing electronic device 104 may be a trusted peer of the user accessing electronic device 102. Conversely, the user accessing electronic device 102 may, or may not, be a trusted peer of the user accessing electronic device 104, e.g. a first user may be a trusted peer of a second user even though the second user is not a trusted peer of the first user. The verification request may include the first identification item and an identifier of the web site corresponding to the first identification item, such as a uniform resource locator of the web site.

In one example, the electronic device 104 may receive the verification request directly from the electronic device 102, such as through a peer-to-peer network connection. Alternatively, or in addition, the electronic device 104 may receive the verification request from the electronic device 102 through the server 110. For example, the server 110 may proxy the verification requests, and the verification responses, of the electronic devices 102, 104, 106, and/or the server 110 may be associated with a social network service through which the trusted-peer based information verification system is provided.

In block 304, the electronic device 104 may determine whether the electronic device 104 received a second identification item for the web site identified by the received identifier, such as a second identification item for the web site received through interactions by the electronic device 104 with the web site. For example, the electronic device 104 may store, such as in memory or in a database, received identification items corresponding to web sites, such as digital certificates, along with identifiers of the web sites corresponding to the identification items. The electronic device 104 may use the identifier of the web site received with the verification request to determine whether the electronic device 104 received an identification item for the web site.

If, in block 304, the electronic device 104 determines that a second identification item for the web site has not been received by the electronic device 104, the electronic device 104 moves to block 314. In block 314, the electronic device 104 provides a verification response to the requesting device indicating that the electronic device 104 has not received an identification item for the web site. Alternatively, or in addition, the electronic device 104 may not transmit any verification response to the requesting device in block 314, such as for the example where electronic devices do not provide a verification response if no comparable identification item has been received by the electronic devices.

If, in block 304, the electronic device 104 determines that an identification item for the web site has been received, the electronic device 104 proceeds to block 306. In block 306, the electronic device 104 retrieves the second identification item for the web site, such as from a memory and/or a database. In block 308, the electronic device 104 compares the second identification item for the web site to the first identification item for the web site. For example, the electronic device 104 may perform a bit comparison of the identification items, a hash comparison, or generally any comparison technique that can determine whether the identification items are substantially equivalent.

If, in block 308, the electronic device 104 determines that the first identification item is different than the second identification item, e.g. the first identification item is not substantially equivalent to the second identification item, the electronic device 104 proceeds to block 310. In block 310, the electronic device 104 blocks communications with the web site corresponding to the second identification item. Since the electronic device 104 has determined that another user has received a different identification item for the web site, the electronic device 104 can determine that one of the electronic devices 102, 104 may be interacting with the web site through an unauthorized server. Thus, the electronic device 104 may block communications with the web site to prevent any malicious interactions from occurring.

In one example, electronic device 104 may block communications with the web site for a period of time, such as one hour, one day, or generally any period of time. The electronic device 104 may delete the identification item received for the web site and may request a new identification item for the web site once the period of time has elapsed. The electronic device 104 may then verify the new identification item, such as through the trusted peer-based information verification system. Alternatively, or in addition, electronic device 104 may block communications with the web site until electronic device 104 receives a communication from the server 110 that indicates that communications with the web site may be resumed.

In block 312, the electronic device 104 may provide a verification response that indicates whether the first identification item is different than the second identification item. For example, the electronic device 104 may transmit a verification response indicating a "match" when the first identification item is substantially equivalent to the second identification item, and the electronic device 104 may transmit a verification response indicating a "mismatch" when the first identification item is different than the second identification item.

Figure 4:
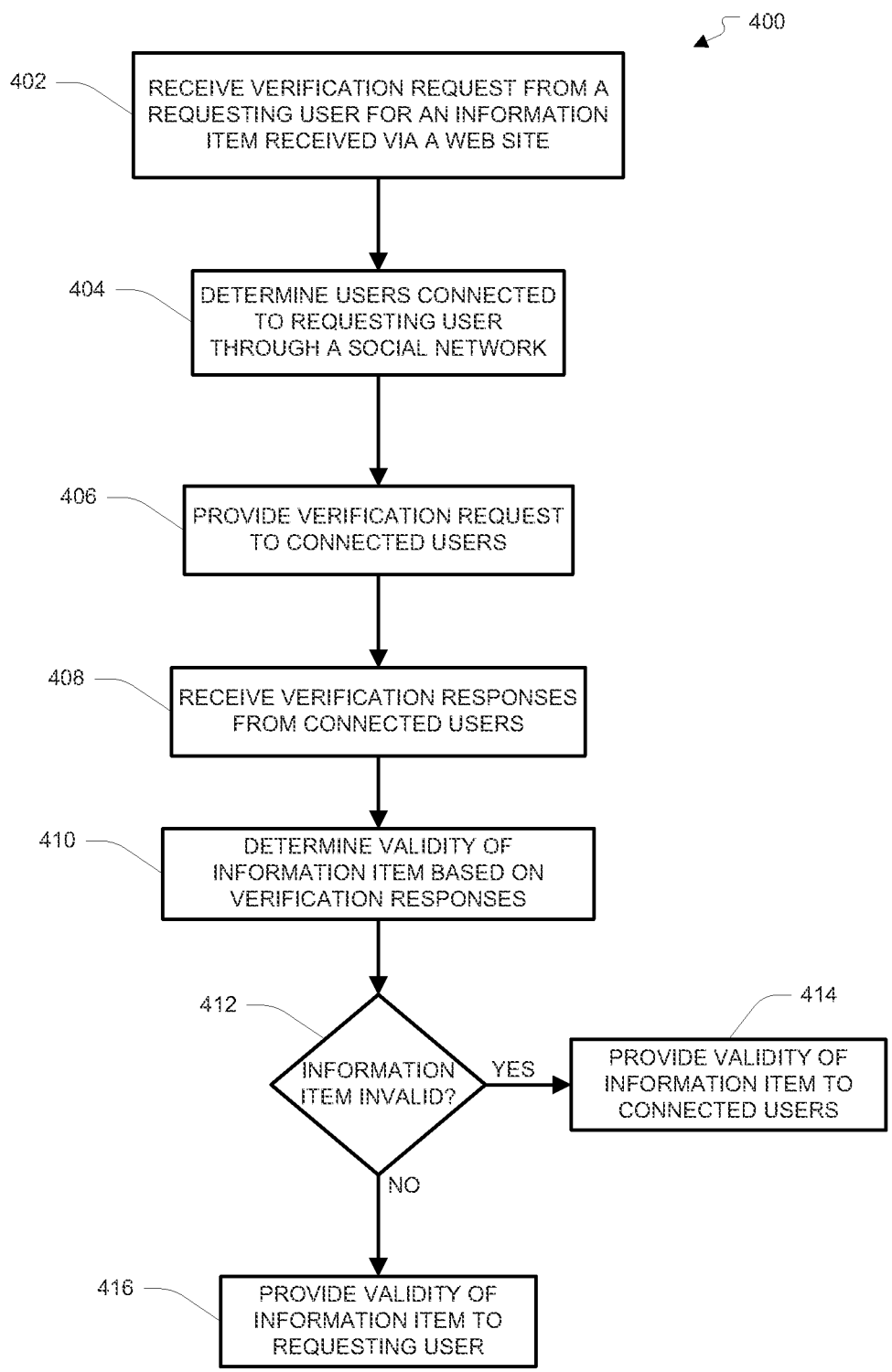
FIG. 4 illustrates a flow diagram of an example process for a trusted peer-based information verification system.

FIG. 4 illustrates a flow diagram of an example process 400 for a trusted peer-based information verification system. In block 402, a server 110, such as a server associated with a social network, or a server providing a trusted peer-based information verification system, receives a verification request from a requesting user for an information item received via a web site. The verification request may include the information item and an identifier of the web site via which the information item was received, such as a uniform resource locator of the web site.

In block 404, the server 110 determines other users that are connected to the requesting user through a social network. In one example, the server 110 may provide a social network service to the users. In this instance, the server 110 may be able to identify the other users connected to the requesting user through a database associated with the social network service. Alternatively, or in addition, the server 110 may provide a trusted peer-based information verification system but may not provide a social network service. In this instance, the server 110 may request contact information for users connected to the requesting user from a social network service, such as by sending a request to a server associated with the social network service over the network 108.

The server 110 may determine the users that are directly connected to the requesting user, e.g. users who are only one degree of separation from the requesting user in the social network, and/or the users that are indirectly connected to the requesting user in the social network. Alternatively, or in addition, the requesting user may identify a degree of separation to be used to determine the connected users in the social network. The degree of separation may be quantitative, such as 1, 2, 10, etc, and/or the degree of separation may be qualitative, such as "close," "distant," etc.

In block 406, the server 110 may provide a verification request to the electronic devices of users determined to be connected to the requesting user. The verification request may include the information item and the uniform receive locator of the web site corresponding to the information item. If the server 110 provides the social network service to the users and/or the server 110 can access procedure calls within the social network service, such as through an application programming interface ("API") call or by sending a request to a server associated with the social network service, the server 110 may provide the verification request through the application framework of the social network service.

For example, the server 110 may provide the verification request to the electronic devices 102, 104, 106, by communicating with an application operating on the electronic devices 102, 104, 106 for accessing the social network service. In this manner, the trusted peer-based information verification system may be implemented within the existing communication and application framework of the social network, for example, without requiring the users to install separate software or hardware modules. Due to the pervasiveness of applications for accessing social network services across the electronic devices 102, 104, 106, the requesting user may be able to receive verification responses from many of the connected users.

Alternatively, or in addition, if the server 110 does not provide the social network service, the server 110 may provide the verification request to the connected users using the determined contact information for the connected users, such as contact information received from the server associated with the social network service. For example, the contact information may include one or more contact information items for the connected users, such as email addresses, telephone numbers, internet protocol addresses, device identifiers, or generally any information that may be used to provide the verification request to electronic devices of the connected users.

In block 408, the server 110 may receive verification responses from the connected users. A verification response received from a connected user may indicate whether the connected user received a comparable information item from the web site that matches, or does not match, the information item received by the requesting user.

In block 410, the server 110 may determine the validity of the information item based on the received verification responses. For example, the server 110 may determine that the information item is invalid if any of the verification responses indicate a mismatch. Conversely, the server 110 may determine that the information item is valid if all of the verification responses indicate a match. Alternatively, or in addition, the number of match or mismatch responses required for a valid or invalid determination may be based on the type of interaction with the web site, such as an active interaction or a passive interaction. In this instance, the requesting user may provide the server 110 with an indication of the type of interaction with the verification request.

In block 412, if the server 110 determined that the information item is valid, the server 110 proceeds to block 416. In block 416, the server 110 provides an indication that the information item is valid to the requesting user. The server 110 may provide the indication through the application framework of the social network service and/or the server 110 may provide the indication separately from the application framework of the social network service.

If, in block 412, the server 110 determined that the information item is invalid, the server 110 proceeds to block 414. In block 414, the server 110 provides an indication that the information is invalid to the requesting user, and to the connected users. The server 110 may provide the indication through the application framework of the social network service and/or the server 110 may provide the indication separately from the application framework of the social network service. In this manner, the server 110 can inform the connected users that there may be security concern associated with the web site.

IV. Example Use Cases for a Trusted Peer-Based Information Verification System

Figure 5:
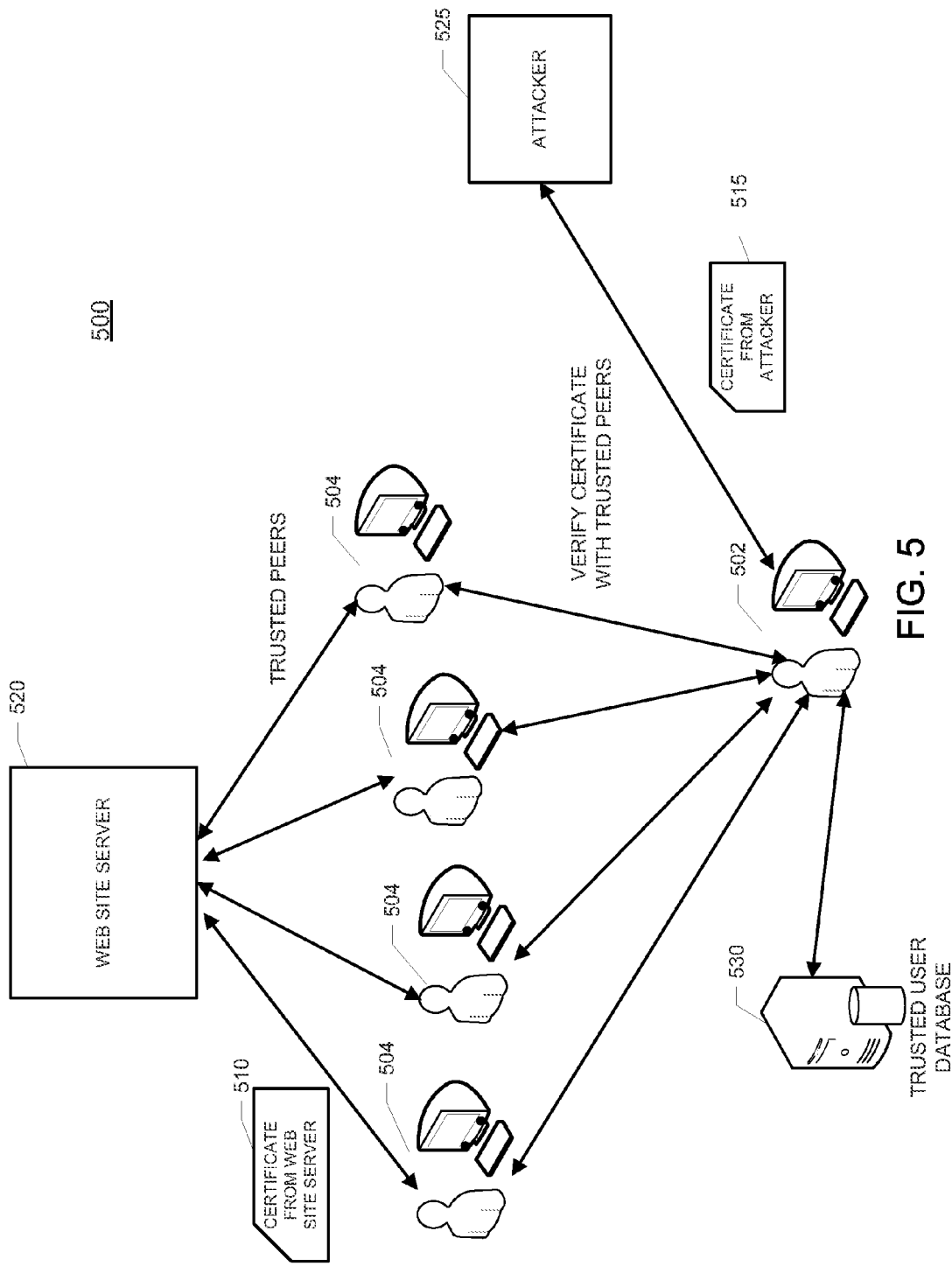
FIG. 5 illustrates an example use case for a trusted peer-based information verification system.

FIG. 5 illustrates an example use case 500 for a trusted peer-based information verification system. In the use case 500, the user 502 may provide a request to access the web site provided by the web site server 520. However, in the use case 500 the request of the user 502 to access the web site is redirected to an attacker 525, such as a man-in-the-middle attacker. The attacker 525 provides a digital certificate 515 to the user 502, such as a public key certificate. In order to verify the validity of the digital certificate 515, the user 502 retrieves contact information for their trusted peers, such as through the trusted user database 530.

The user 502 then provides verification requests to the trusted peers 504 that include the digital certificate 515 received from the attacker 525, and an identifier of the web site that the user 502 attempted to access. The user 502 may provide the verification request directed to the trusted peers, or the user 502 may provide the verification requests to the trusted peers through a sever, such as a server associated with a social network service. The trusted peers 504 each may have previously accessed the web site through the web site server 520 before the web site was attacked by the attacker 525. As such, the trusted peers 504 each received a digital certificate 510 from the actual web site server 520 for the web site, e.g. the web server operated by the entity represented by the web site.

Upon receiving the verification requests from the user 502, the trusted peers 504 may each compare the digital certificate 510 that they received from the web site server 520 with the digital certificate 515 included with the verification request. Since the digital certificate 510 is different than the digital certificate 515, the trusted peers 504 may each provide a verification response to the user 502 indicating a mismatch, e.g. indicating that the digital certificate 510 received by the user 502 for the web site does not match the digital certificate 515 received by the trusted peers 504 for the web site.

The user 502 may receive the verification responses from the trusted peers 504. Since each of the verification responses may indicate a mismatch, the user 502 may determine that the digital certificate 515 is invalid. Upon determining that the digital certificate 515 is invalid, the user 502 may block communications with the attacker 525, such as for a period of time or until receiving a communication indicating that communications with the web site may be resumed.

Figure 6:
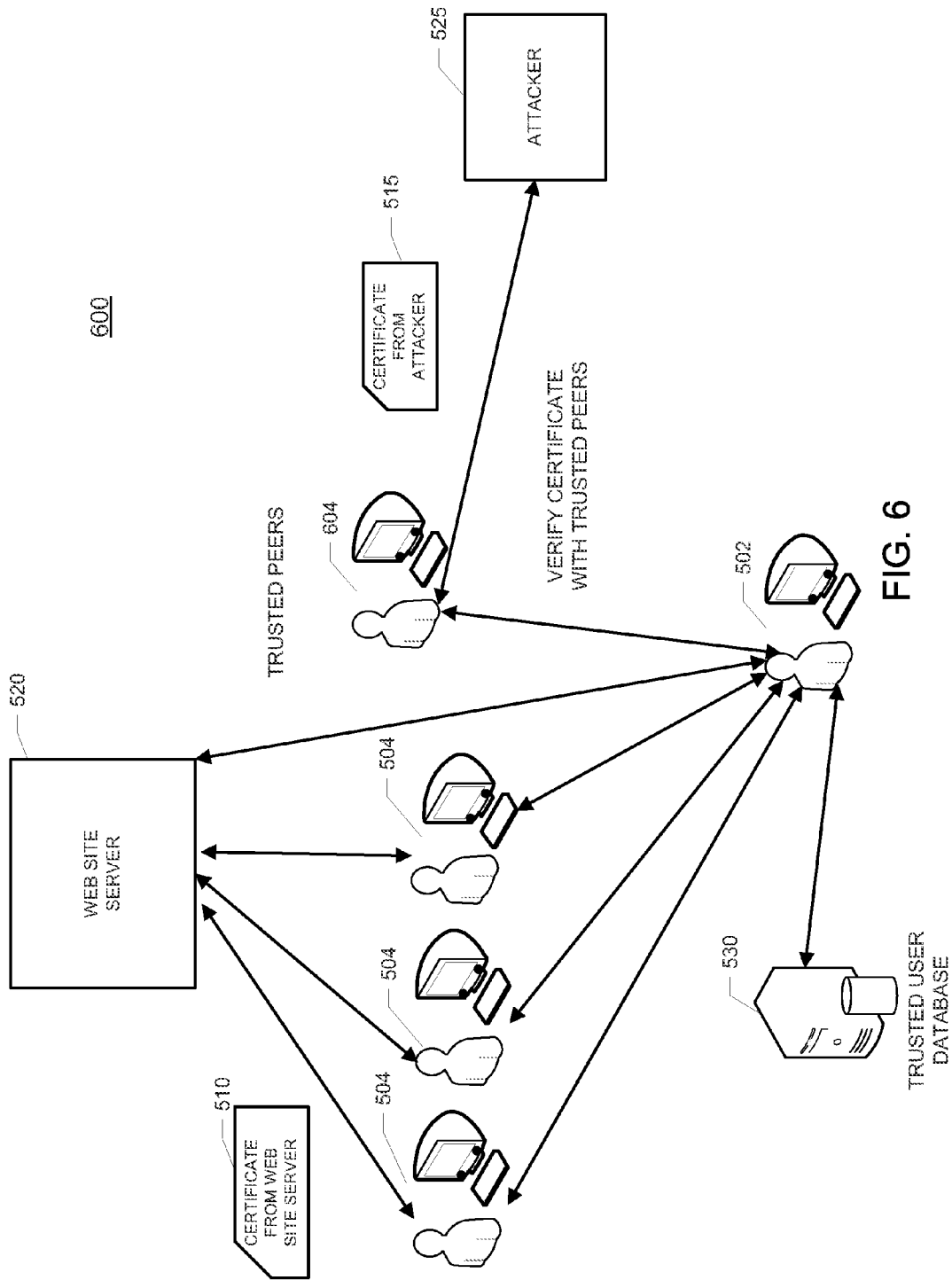
FIG. 6 illustrates an example use case for a trusted peer-based information verification system.

FIG. 6 illustrates an example use case 600 for a trusted peer-based information verification system. In the use case 600, the user 502 requests to access a web site, and the user's request is provided to the web site server 520 for the web site. The user 502 may then receive a digital certificate 510 from the web site server 520. In order to verify the validity of the digital certificate 510, the user 502 retrieves contact information for their trusted peers, where that contact information may be stored in the trusted user database 530.

The user 502 then provides a verification requests to the trusted peers 504 that includes the digital certificate 510 received from the web site server 520 and an identifier of the web site that the user 502 attempted to access. The trusted peers 504 each previously accessed the web site server 520 and received the digital certificate 510 from the web site server 520. As such, the trusted peers 504 each received the digital certificate 510 from the actual web site server 520 corresponding to the web site, e.g. the web server operated by the entity represented by the web site. However, the trusted peer 604 attempted to access the web site and was redirected to the attacker 525. As such, the trusted peer 604 received the digital certificate 515 from the attacker 525.

Upon receiving the verification requests from the user 502, the trusted peers 504 may each compare the digital certificate 510 that they received from the web site server 520 with the digital certificate 510 included with the verification request. Since the digital certificate 510 received by the trusted peers 504 is the same as the digital certificate 510 included in the verification request, each of the trusted peers 504 may provide a verification response to the user 502 indicating a match, e.g. indicating that the digital certificate 510 received by the user 502 for the web site is the same as the digital certificate 510 received by the trusted peers 504 for the web site.

The trusted peer 604 may compare the digital certificate 515 that they received from the attacker 525 for the web site with the digital certificate 510 included with the verification request. Since the digital certificate 515 is different than the digital certificate 510, the trusted peer 604 may provide a verification response to the user 502 indicating a mismatch, e.g. indicating that the digital certificate 510 received by the user 502 for the web site does not match the digital certificate 515 received by the trusted peer 604 for the web site.

The user 502 may receive the verification responses from the trusted peers 504. Since one of the verification responses may indicate a mismatch, e.g. the verification response received from the trusted user 604, the user 502 may determine that the digital certificate 510 may be invalid. Upon determining that the digital certificate 510 may be invalid, the user 502 may block communications with the attacker 525. Although the user 502 received the actual digital certificate 510 for the web site, since the verification response from the trusted peer 604 indicated a mismatch, there may be a security concern with regards to the web site.

Alternatively, or in addition, the trusted peer-based information verification system may utilize different thresholds for determining the validity of a digital certificate. For example, the threshold for determining that a digital certificate is valid may be based on the percentage of received verification responses indicating a match, such as seventy-five percent of the received verification responses indicating a match. In the use case 600, since the user 502 may have received three verification responses from the trusted peers 504 that indicate a match, and one verification response from the trusted peer 604 that indicates a mismatch, seventy-five percent of the received verification responses indicated a match. As such, a seventy-five percent match threshold would have been satisfied by the verification responses received in the use case 600.

V. Example Trusted-Peer Based Information Verification System

Figure 7:
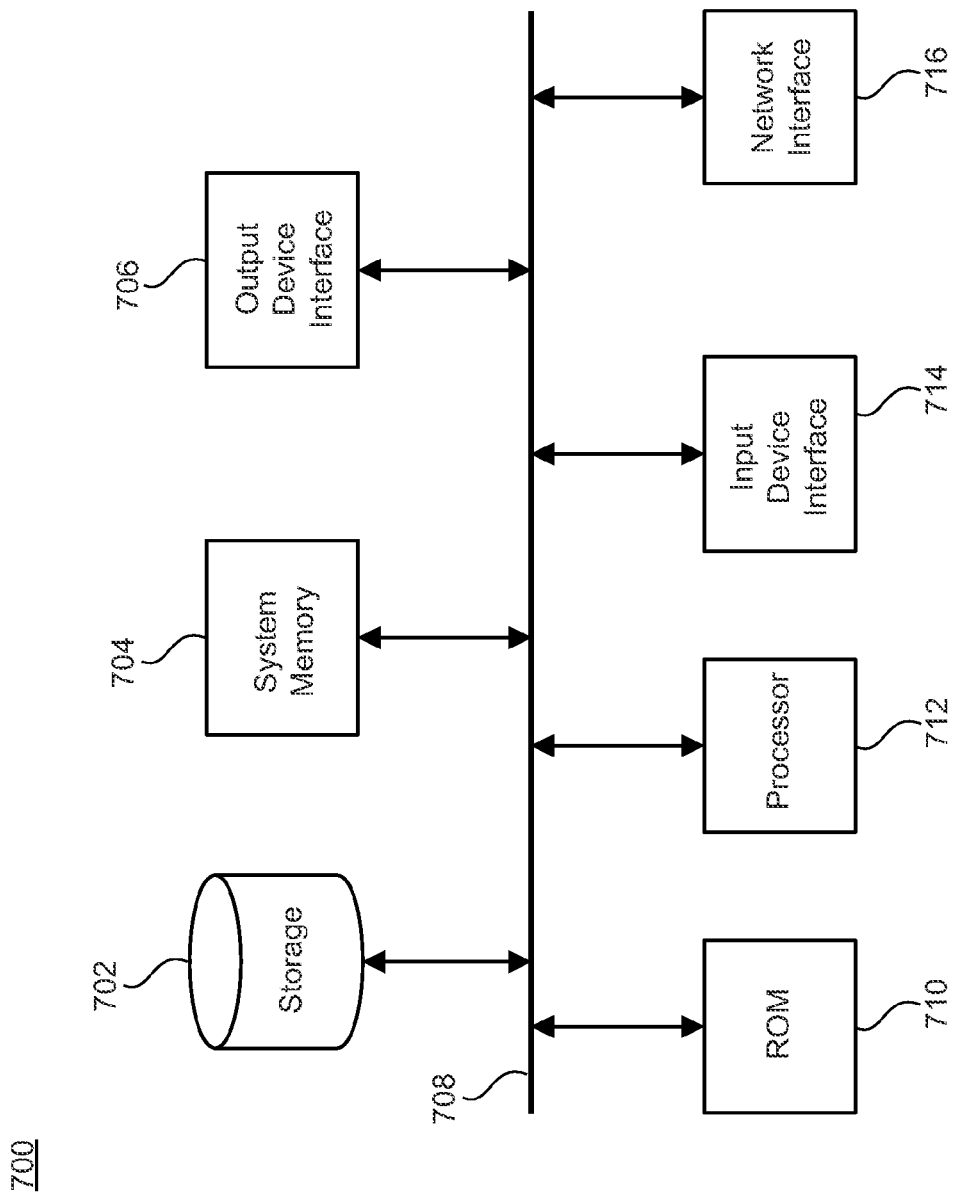
FIG. 7 conceptually illustrates an electronic system with which some implementations of the subject technology may be implemented.

FIG. 7 conceptually illustrates an electronic system with which some implementations of the subject technology are implemented. Electronic system 700 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such a random access memory. System memory 704 stores some of the instructions and data that the processor needs at runtime. In some implementations, the processes of the subject disclosure are stored in system memory 704, permanent storage device 702, and/or ROM 710. For example, the various memory units may include instructions for processing, generating, and/or providing verification requests and/or verification responses in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interfaces 706 enables, for example, the display of images generated by the electronic system 700. Output devices used with output device interface 706 include, for example, printers and display devices, such as cathode ray tubes (CRT) or liquid crystal displays (LCD). Some implementations include devices such as a touchscreen that functions as both input and output devices.

Finally, as shown in FIG. 7, bus 708 also couples electronic system 700 to a network (not shown) through a network interface 716. In this manner, the computer can be a part of a network of computers (such as a local area network ("LAN"), a wide area network ("WAN"), or an Intranet, or a network of networks, such as the Internet. Any or all components of electronic system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A device comprising:
at least one processor circuit configured to:
receive a public key certificate from a server hosting a web site in response to initiation of an interaction with the web site, the public key certificate signed by a private key of a trusted third party and associated with a plurality of types of interactions with the web site, the initiated interaction with the web site characterized by one of the plurality of types of interactions, wherein each of the plurality of types of interactions is associated with one of a plurality of different blocking thresholds that are determinable independent of the public key certificate;
provide a request for verification of content of the public key certificate to devices of trusted peers;
receive verification responses from the devices of the trusted peers, wherein the verification responses are indicative of whether public key certificates received by the devices of the trusted peers via the web site are the same as the public key certificate received from the server hosting the web site, are different than the public key certificate received from the server hosting the web site, or whether the devices did not receive the public key certificates via the web site, the public key certificates received by the devices also being signed by the private key of the trusted third party;

determine a validity of the public key certificate based at least on the verification responses received from the devices of the trusted peers, wherein at least one of the plurality of types of interactions with the web site is allowed when the public key certificate is determined to be valid;

determine whether to block the initiated interaction with the web site based at least on whether a number of the verification responses that indicate that the public key certificates received from the devices are different than the public key certificate satisfies the one of the plurality of different blocking thresholds associated with the one of the plurality of types of interactions that characterizes the initiated interaction; and block the initiated interaction with the web site when the one of the plurality of different blocking thresholds associated with the one of the plurality of types of interactions that characterizes the initiated interaction is satisfied, irrespective of the determined validity of the public key certificate.

2. The device of claim 1, wherein the at least one processor circuit is further configured to:

receive a list comprising identification information for contacting each of a plurality of users via a social network, wherein the providing the request for verification to the devices of trusted peers is performed using the identification information of the list.

3. A computer-implemented method for providing a trusted peer-based information verification system, the method comprising:

receiving, using one or more computing devices, a public key certificate from a server hosting a web site in response to initiation of an interaction with the web site, the public key certificate signed by a private key of a trusted third party and associated with a plurality of types of interactions with the web site, the initiated interaction with the web site characterized by one of the plurality of types of interactions, wherein each of the plurality of types of interactions is associated with one of a plurality of different blocking thresholds that are determinable independent of the public key certificate;

providing, using the one or more computing devices, a request for verification of content of the public key certificate to devices of trusted peers;

receiving, using the one or more computing devices, verification responses from the devices of the trusted peers, wherein the verification responses are indicative of whether public key certificates received by the devices of the trusted peers via the web site are the same as the public key certificate received from the server hosting the web site, are different than the public key certificate received from the server hosting the web site, or whether the devices did not receive the public key certificates via the web site, the public key certificates received by the devices also being signed by the private key of the trusted third party;

determining, using the one or more computing devices, a validity of the public key certificate based at least on the verification responses received from the devices of the trusted peers, wherein at least one of the plurality of types of interactions with the web site is allowed when the public key certificate is determined to be valid;

determining whether to block the initiated interaction with the web site based at least on whether a number of the verification responses that indicate that the public key certificates received from the devices are different than the public key certificate satisfies the one of the plurality of different blocking thresholds associated with the one of the plurality of types of interactions that characterizes the initiated interaction; and blocking, using the one or more computing devices, the initiated interaction with the web site when the one of the plurality of different blocking thresholds associated with the one of the plurality of types of interactions that characterizes the initiated interaction is satisfied, irrespective of the determined validity of the public key certificate.

4. The method of claim 3, further comprising:

allowing the interaction with the web site when the one of the plurality of different blocking thresholds associated with the one of the plurality of types of interactions that characterizes the initiated interaction is not satisfied.

5. The method of claim 4, wherein the number of the verification responses that indicate that the public key certificates received from the devices are different than the public key certificate satisfies a first blocking threshold associated with a first type of the plurality of types of interactions with the web site that are associated with the public key certificate and does not satisfy a second blocking threshold associated with a second type of the plurality of types of interactions with the web site that are associated with the public key certificate.

6. The method of claim 3, further comprising establishing, using the one or more computing devices, a connection with a server associated with a social network, wherein the providing and the receiving are performed through the server associated with the social network.

7. The method of claim 3, wherein the determining, using the one or more computing devices, the validity of the public key certificate based on the verification responses received from the devices of the trusted peers further comprises determining, using the one or more computing devices, the validity of the public key certificate based on a number of the verification responses that indicate that the public key certificates received by the devices of the trusted peers are different than the public key certificate received from the server hosting the web site.

8. The method of claim 3, wherein the request for verification of the public key certificate comprises the public key certificate and an identifier of the web site.

9. The method of claim 3, wherein the request for verification of the public key certificate comprises an indicia of the public key certificate and an identifier of the web site.

10. The method of claim 3, further comprising establishing, using the one or more computing devices, peer-to-peer connections with the devices of the trusted peers, wherein the providing and the receiving are performed via the peer-to-peer network connections.

11. The method of claim 3, wherein a first type of the plurality of types of interactions with the web site comprises an active interaction with the web site, a second type of the plurality of types of interactions with the web site comprises a passive interaction with the web site, and a first blocking threshold of the plurality of different blocking thresholds that is associated with the first type is satisfied by a higher number of the verification responses that indicate that the public key certificates received from the devices are different than the public key certificate than a second blocking threshold of the plurality of different blocking thresholds associated with the second type.

12. The method of claim 3, further comprising:
blocking, using the one or more computing devices, the interaction with the web site when the one of the plurality of different blocking thresholds associated with the one of the plurality of types of interactions is satisfied and the public key certificate is determined to be valid.

13. A system, comprising:
one or more processors; and
a memory device storing instructions that, when executed by the one or more processors, cause the one or more processors to facilitate the steps of:
  receiving a public key certificate from a server hosting a web site in response to initiation of an interaction with the web site, the public key certificate signed by a private key of a trusted certificate provider and associated with a plurality of types of interactions with the web site, the initiated interaction with the web site characterized by one of the plurality of types of interactions, wherein each of the plurality of types of interactions is associated with one of a plurality of different blocking thresholds that are determinable independent of the public key certificate;
  providing a request for verification of content of the public key certificate to devices of trusted peers;
  receiving verification responses from the devices of the trusted peers, wherein the verification responses are indicative of whether public key certificates received by the devices of the trusted peers via the web site are the same as the public key certificate received from the server hosting the web site, are different than the public key certificate received from the server hosting the web site, or whether the devices did not receive the public key certificates via the web site, the public key certificates received by the devices also being signed by the private key of the trusted certificate provider;
  determining a validity of the public key certificate based at least on the verification responses received from the devices of the trusted peers, wherein at least one of the plurality of types of interactions with the web site is allowed when the public key certificate is determined to be valid;
  determining whether to block the initiated interaction with the web site based at least on whether a number of the verification responses that indicate that the public key certificates received from the devices are different than the public key certificate satisfies the one of the plurality of different blocking thresholds associated with the one of the plurality of types of interactions that characterizes the initiated interaction; and
  blocking the initiated interaction with the web site when the one of the plurality of different blocking thresholds associated with the one of the plurality of types of interactions that characterizes the initiated interaction is satisfied, irrespective of the determined validity of the public key certificate.

14. A non-transitory machine readable medium embodying instructions that, when executed by a machine, allow the machine to perform a method for providing a trusted peer-based information verification system, the method comprising:
  receiving a public key certificate from a server hosting a web site in response to initiation of an interaction with the web site, the public key certificate signed by a private key of a trusted third party and associated with a plurality of types of interactions with the web site, the initiated interaction with the web site characterized by one of the plurality of types of interactions, wherein each of the plurality of types of interactions is associated with one of a plurality of different blocking thresholds that are determinable independent of the public key certificate;
  providing a request for verification of content of the public key certificate to devices of trusted peers;
  receiving verification responses from the devices of the trusted peers, wherein the verification responses are indicative of whether public key certificates received by the devices of the trusted peers via the web site are the same as the public key certificate received from the server hosting the web site, are different than the public key certificate received from the server hosting the web site, or whether the devices did not receive the public key certificates via the web site, the public key certificates received by the devices also being signed by the private key of the trusted third party;
  determining a validity of the public key certificate based at least on the verification responses received from the devices of the trusted peers, wherein at least one of the plurality of types of interactions with the web site is allowed when the public key certificate is determined to be valid;
  determining whether to block the initiated interaction with the web site based at least on whether a number of the verification responses that indicate that the public key certificates received from the devices are different than the public key certificate satisfies the one of the plurality of different blocking thresholds associated with the one of the plurality of types of interactions that characterizes the initiated interaction; and
  blocking the initiated interaction with the web site when the one of the plurality of different blocking thresholds associated with the one of the plurality of types of interactions that characterizes the initiated interaction is satisfied, irrespective of the determined validity of the public key certificate.

15. The non-transitory machine readable medium of claim 14, wherein determining the validity of the public key certificate based on the received verification responses further comprises determining the validity of the public key certificate based on a number of the verification responses that indicate that the public key certificates received from the devices are different than the public key certificate of the request for verification.

16. The non-transitory machine readable medium of claim 14, the method further comprising receiving a list that comprises identification information for contacting each of a plurality of users via a social network, wherein providing the request for verification to devices of trusted peers is performed using the identification information of the list.

17. The non-transitory machine readable medium of claim 14, wherein a first verification response of the received verification responses indicates that a first public key certificate received by a first device of the devices of the trusted peers via the web site is different than the public key certificate of the request for verification.

* * * * *